Nov. 14, 1967 H. J. HOMRIG 3,352,963
HIGH PRESSURE, HIGH TEMPERATURE ELECTRICAL LEAD-THROUGH FITTING
Filed Jan. 13, 1967
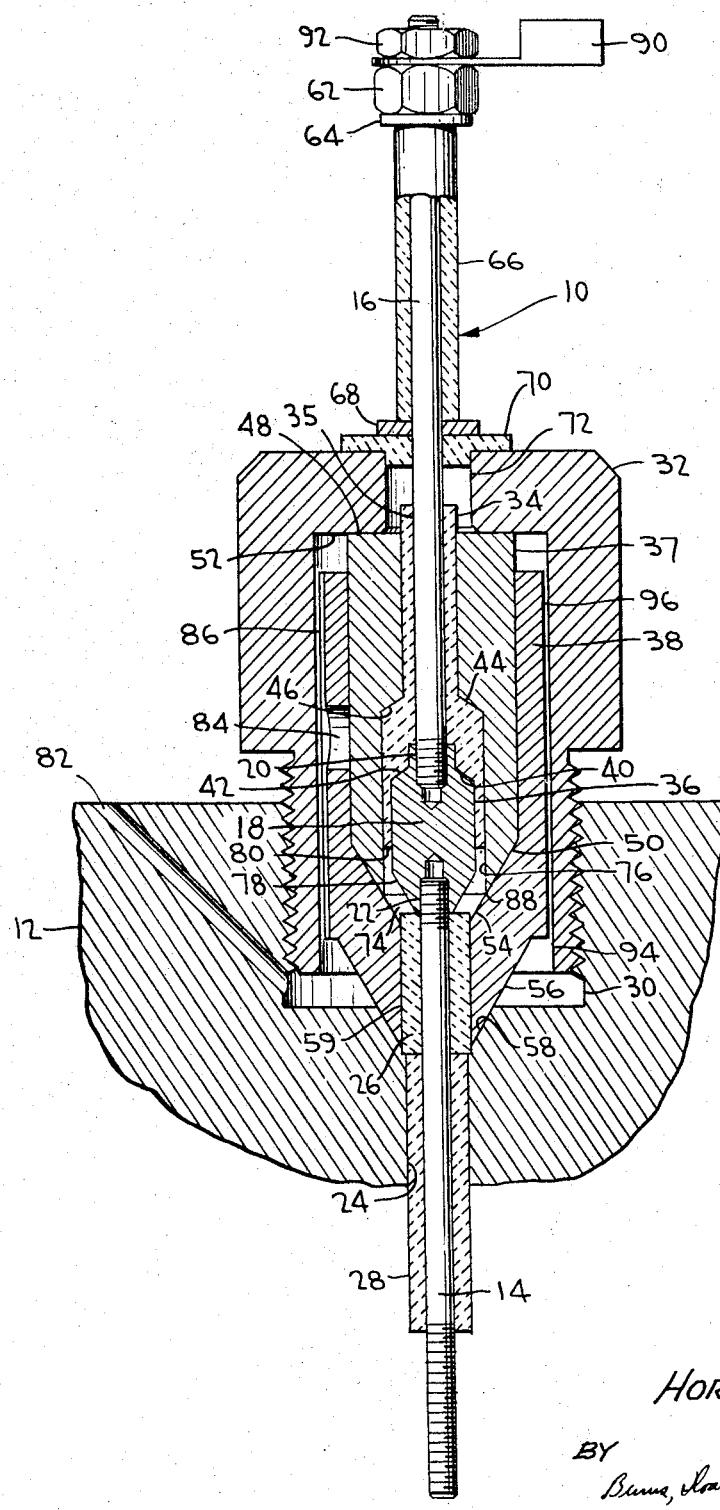
INVENTOR,
HORACE J. HOMRIG
BY
Burns, Doane, Benedict, Swecker & Mathis
ATTORNEYS

United States Patent Office 3,352,963
Patented Nov. 14, 1967

3,352,963
HIGH PRESSURE, HIGH TEMPERATURE ELECTRICAL LEAD-THROUGH FITTING

Horace J. Homrig, Duncan, Okla., assignor to Halliburton Company, Duncan, Okla., a corporation of Delaware Filed Jan. 13, 1967, Ser. No. 609,129
12 Claims. (Cl. 174—151)

ABSTRACT OF THE DISCLOSURE

An electrical fitting for conducting electric current through an electrically conductive wall which is subjected to high pressure differentials and high temperatures. A low pressure side conductor rod and a high pressure side conductor rod are joined together by means of a conductive connector member provided with an external conical sealing surface received within an insulating sleeve having an internal tapered seat. The sleeve and the connector are received within a pair of nested concentric metal sleeves each having complementary tapered sealing surfaces and seats. A hollow loading nut houses the sleeves and connector and is adapted to draw them together into sealing relation when the nut is threadably secured to the wall. Cavities within the loading nut are ported to the low pressure side to prevent a potentially dangerous buildup of high pressure fluid in the event of leakage past the sealed areas.

*Background of the invention*

This invention relates to electrical fittings and more particularly to an electrical fitting for conducting electrical currents through an electrically conductive wall or bulkhead which is subjected to very high pressure differentials and high temperatures.

In the use of electrical devices for measuring and testing conditions within a high pressure vessel, it is generally necessary to provide a connector or fitting for conducting electric current through the wall of the vessel which is usually made of a conductive material such as steel. Such a fitting should be able to substantially prevent leakage of fluid from the high pressure side of the wall to the low pressure side of the wall and should provide a means for insulating the electrical leads or conductors passing through the wall from the wall itself.

Others heretofore have devised fittings for conducting electric current under such conditions which have performed satisfactorily under pressure differentials of up to about 3,000 lbs. per sq. in. However, the prior art fittings have not been found to be satisfactory in situations when pressure differentials of up to about 50,000 lbs. per sq. in. may be encountered.

For example, in measuring the apparent viscosity and pumpability of ail well cement slurries under simulated well conditions, pressures of up to about 50,000 lbs. per sq. in. and temperatures ranging up to about 750° Fahrenheit are encountered. In such cases, the problems center on the fact that the conducting element such as a rod which passes through the bulkhead must be insulated from the conductive bulkhead while at the same time an effective high pressure seal must be maintained between the conductor rod and the fitting and between the fitting and the bulkhead.

Accordingly, a principal object of the invention is to provide a fitting for an electrical conductor which is adapted to pass through an electrically conductive wall of a vessel wherein the fitting insulates the conductor from the wall and is capable of retaining fluids within the vessel at very high pressures and at high temperatures.

Another object of the present invention is to provide a high pressure, high temperature fitting for an electrical conductor which is adapted to pass through an electrically conductive bulkhead, wherein the fitting is self sealing.

*Summary*

In a preferred embodiment of the present invention, a hollow loading nut is adapted to be secured to the low pressure side of an electrically conductive wall of a high pressure vessel about a bore formed through the wall. A high pressure side conductor rod extends through the bore and is adapted to be connected to a low pressure side conductor rod by means of a rigid connector body concentrically disposed within the loading nut and provided with an external conical sealing surface. The connector body and the low pressure side conductor rod are received within a rigid insulator seal sleeve having an internal conical seat for the connector body. The insulator sleeve is disposed within a rigid metal bearing ring which in turn disposed within a rigid metal sealing collar, with the sleeve, ring and collar all having substantially matching conical sealing surfaces and seats and being disposed within the loading nut. The sealing collar is adapted to be forced into sealing contact with the vessel wall and the other internal parts of the fitting are adapted to be drawn together into an initial sealing relation when the loading nut is secured to the wall. The forces of the high pressure fluid within the vessel are allowed to act on the internal parts of the fitting to increase the sealing forces between them and between the internal parts and the vessel wall and loading nut.

Cavities within the fitting may be ported to the low pressure side of the vessel to prevent the pressure of high pressure fluids trapped therein from building up to dangerously high proportions.

*Brief description of the drawing*

The drawing shows a cross-sectional view of a preferred embodiment of an electrical fitting in accordance with the invention secured to the wall of a high pressure, high temperature vessel.

*Description of the preferred embodiment*

In the drawing, a fitting generally indicated by the reference number 10 is adapted to conduct an electric current through an electrically conductive wall or bulkhead 12 which may be subjected to very high fluid pressure differentials and high temperatures. The fitting 10 includes a high pressure side or inner conductor rod 14 and a low pressure side or outer conductor rod 16 joined together by a rigid conductive connector body 18. Tapped outer and inner bores 20 and 22 may be formed in the connector body 18 for threadably receiving the inner end of the outer conductor rod 16 and the outer end of the inner conductor rod 14, respectively. These parts are preferably fabricated from beryllium copper for good conductivity and high strength.

The inner conductor rod 14 passes through a smooth walled bore 24 formed in the wall 12 and is insulated therefrom by a pair of axially aligned insulating sleeves 26 and 28. The more 24 is counterbored at the outer surface of the wall 12 to provide an enlarged opening or recess 30 which may be tapped to threadably receive the inner threaded end of a hollow loading nut 32.

Centrally disposed within the loading nut 32 is a rigid insulator seal sleeve 34 having an axial bore 35 which slidably receives the inner end portion of the outer conductor rod. The inner end of the insulator sleeve 34 is enlarged at 36 to slidably receive and enclose the connector body 18.

A rigid metal bearing ring 37 is concentrically disposed about the insulator sleeve 34 and nests concentrically in a tubular, rigid metal sealing collar 38. The insulator seal sleeve 34 is preferably made of a high strength, heat resistant, laminated asbestos material, and the bearing ring 37, the sealing collar 38 and the loading nut 32 are preferably fabricated from a suitable heat treated alloy steel.

The insulator sleeve 34 has an internal conical seat 40 which substantially matches a conical sealing surface 42 formed on the outer end of the connector member 18, and has an external conical sealing surface 44 which is substantially complementary to an internal conical seat 46 formed in the bearing ring 37.

The bearing ring 37 is provided with a flat bearing face 48 at its outer end and with an external conical sealing surface 50 at its inner end. The bearing face 48 is adapted to sealingly engage a substantially complementary flat end wall 52 of the loading nut 32, and the conical surface 50 is formed to approximately match an internal conical seat 54 formed within the sealing collar 38. An external conical sealing surface 56 is formed on the inner end of the sealing collar 38 so as to be substantially complementary with a conical seat 58 formed about the bore 24 at the bottom of the recess 30. The sealing collar 38 has an axial bore 59 formed in the inner tapered end thereof through which the insulating sleeve 26 is slidably received.

In the installation of the fitting 10, initial seals are established between the conductive connector 18 and the insulator seal sleeve 34, between the insulator seal sleeve and the bearing ring 37, and between the bearing ring and the loading nut 32, when the connector 18 is drawn outwardly by outward axial movement of the outer conductor rod 16 relative to the loading nut. This movement may be accomplished by drawing a torque nut 62 threaded on the outer end of the conductor rod 16 inwardly against a flat metal washer 64, a standoff insulator sleeve 66, a second flat metal washer 68, and an insulator washer 70 seated in a bore 72 formed through the closed end of the loading nut 32. The standoff insulator sleeve 66 is preferably made from a high strength ceramic material, while the insulator washer 70 may be advantageously fabricated from the same high strength, temperature resistant, laminated asbestos substance used for the insulator seal sleeve 34. The metal washers may be made of brass. Seals may then be established between the sealing collar 38 and the vessel wall 12 and between the sealing collar and the bearing ring 37 when the loading nut 32 is drawn into the tapped recess 30. Additionally, the sealing forces are increased between the bearing ring 37 and the loading nut 32 when the loading nut is torqued in the recess. A seal may also be established between the sealing collar 38 and the insulating sleeve 26 during installation of the fitting 10 as the conical sealing surface 56 of the sealing collar is urged into sealing contact with its seat 58.

A self sealing feature of the fitting assembly 10 is provided by the forces of high pressure fluid which may leak past the insulating sleeve 26 and the rod 14 and enter an annular cavity or chamber 74 formed between the inner cylindrical surface 76 of the bearing ring 37 and the outer surface of the connector 18. These forces will act on a lower annular tapered surface 78 of the connector 18, and on the area of an inner annular flat face 80 of the insulator sleeve 34 to increase the sealing forces between the connector 18, insulator sleeve 34, and the bearing ring 37. The pressure of this trapped fluid also acts radially outwardly on the inner surface 76 of the bearing ring 37 to increase the sealing relation between the conical surfaces 50 and 54 of the bearing ring and sealing collar, respectively. In addition, the trapped high pressure fluid in the chamber 74 acts radially outwardly on the internal conical seat 54 of the sealing collar to increase the sealing contact between the sealing collar and its conical seat 58 in the wall 12. Thus, the high pressure fluid which enters the chamber 74 acts on the internal parts of the fitting 10 and increases the sealing forces between them and between the internal parts, the loading nut and vessel wall.

In order to prevent the fitting 10 from becoming a potentially dangerous projectile which may result from an excessive buildup of high pressure fluid within the hollow loading nut 32, a relief channel 82 in the wall 12 provides fluid communication between the low pressure side of the wall and the recess 30. High pressure fluid which may leak past the seals established between the sealing collar 38 and the bearing ring 37 is ported to the recess 30 by an orifice 84 formed in the wall of the sealing collar 38 and an axially extending groove 86 formed in the outer surface of the sealing collar.

When the fitting 10 is assembled for use, the longitudinal or axial compressive forces on the various sealing members disposed within the hollow loading nut 32 which result from the axial loads placed on the connector 18 and the nut 32, are transformed into generally radial compressive forces by means of the substantially matching conical sealing surfaces and seats of the respective members. The conical mating surfaces between the several metal-to-metal seals initially may have slightly different cone angles such that initial line contact is produced at the smallest diameters between the mating surfaces at low torque settings of the nuts 32 and 62. For example, the included angle of the internal conical seat 54 of the sealing collar 38 may be about sixty degrees and the included angle of the conical sealing surface 50 of the bearing ring 37 may be about fifty-eight degrees. Thus, initial line contact between the ring 37 and the collar 38 may be produced at 88. By this arrangement, the sealing areas between mating members will increase due to the slight deformation of the members which is produced as the axial loads are increased.

A terminal connector 90 may be conveniently positioned on the outer end of the conductor rod 16 above the torque nut 62 and held in place by a suitable terminal nut 92.

Problems which may develop from the uneven thermal expansion between the loading nut 32 and the internal parts may be substantially overcome by providing a small amount of clearance between the inner cylindrical wall 94 of the loading nut 32 and the outer cylindrical surface 96 of the sealing collar 38.

The high compression strength of the insulating members, particularly the insulator seal sleeve 34 and the insulating sleeve 26 are taken full advantage of in the present invention by subjecting these members to axial and/or radial compressive forces only to maintain effective fluid-tight seals with their respective metal members.

The electrical fitting of the present invention has been successful in retaining fluids within the vessel wall 12 at a pressure of 50,000 lbs. per sq. in with surges to 55,000 lbs. per sq. in.

Although a preferred embodiment of the invention has been described and illustrated herein, it is to be understood that various alterations, modifications and changes thereto may be made within the scoupe of the invention as hereinafter claimed.

What is claimed is:

1. A fitting for conducting electric current through a wall of a high pressure, high temperature vessel comprising:
   a low pressure side conductor rod and a high pressure side conductor rod,
   a connector,
   means securing said conductor rods to opposite ends of said connector in axial alignment,
   a bearing ring mounted in coaxial relation over said low pressure side conductor rod,
   insulator means between said ring and said low pressure side conductor rod,
   a loading nut having screw threads thereon and a central bore extending therethrough, said nut including an internal radial shoulder in said bore,
   means clamping said bearing ring between said connector and said nut shoulder in fluid sealing relation, a sealing collar mounted in coaxial relation over said bearing ring, said high pressure side conductor rod extending through an opening in said collar, and insulating means between said collar opening and said high pressure rod, said collar and said bearing ring having substantially mating sealing surfaces therebetween.

2. The fitting according to claim 1, wherein:

said bearing ring has a bearing face at one end, said bearing face being in abutting relation with said loading nut shoulder, said ring having a conical sealing surface at the opposite end, said sealing collar having a conical seat therein in position to be engaged by said sealing surface upon axial movement of said collar toward said loading nut, whereby a fluid seal is formed therebetween when said loading nut is threaded into a bore in a vessel wall.

3. In combination, a fitting for conducting electric current and a conductive wall of a vessel, said wall having an opening through which said fitting extends, comprising:

a hollow rigid metal loading nut, screw thread means securing said loading nut to said vessel wall, a low pressure side conductor rod having an inner end extending into said loading nut, a high pressure side conductor rod having an outer end extending into said loading nut, rigid connector means disposed in said loading nut joining said ends of said conductor rod together in substantially end-to-end axially aligned relation, rigid tubular metal sealing means disposed in said loading nut and enclosing said ends of said conductor rods and said connector means, rigid insulator sleeve means interposed between said rigid metal sealing means and said connector means, said insulator means and said connector means having substantially mating conical sealing surfaces, said insulator means and said rigid metal sealing means having substantially mating conical sealing surfaces, means on said loading nut producing relative axial movement between said loading nut and said connector means to thereby place said rigid insulator sleeve under initial axial and radial compression between said rigid metal sealing means and said connector, whereby initial fluid-tight seals are established therebetween, and said screw thread means producing relative axial movement between said loading nut and said wall upon rotation of said nut to thereby place said rigid insulator sleeve under increased axial and radial compression between said rigid metal sealing means and said connector, whereby said initial fluid-tight seals established thereby are increased in effectiveness.

4. The fitting as set forth in claim 3, wherein:

said hollow loading nut and said metal sealing means are fabricated of a high strength steel, and said insulator sleeve means is fabricated of a high strength, heat resistant, laminated asbestos material.

5. The fitting as set forth in claim 3, wherein:

said rigid tubular metal sealing means and said loading nut have substantially mating sealing surfaces, and said rigid metal sealing means and said wall have substantially mating conical sealing surfaces, said rigid metal sealing means is forced into sealing contact with said loading nut and with said wall when said relative axial movement between said loading nut and said wall is effected.

6. The fitting as set forth in claim 5, wherein:

a rigid tubular insulating member is interposed between said high pressure side conductor rod adjacent said outer end thereof and said rigid tubular metal sealing means, and said insulating member is maintained in compression between the high pressure side conductor rod and said rigid metal sealing means to thereby establish fluid-tight seals therebetween when said relative axial movement between said loading nut and said wall is effected.

7. The fitting as set forth in claim 6, wherein:

said connector means, said insulator sleeve means, said rigid metal sealing means and said insulating member define an annular substantially sealed chamber within said loading nut into which high pressure fluid from said vessel may enter, whereby the pressure of such fluid entering said chamber is allowed to act on the several internal parts of said fitting to thereby increase the sealing forces on the seals established therebetween and between the internal parts, the loading nut and the vessel wall.

8. In combination, a high pressure fitting for conducting an electric current and a bulkhead, said bulkhead having a bore through which said fitting extends, comprising:

a low pressure side conductor rod having an inner end, a high pressure side conductor rod having an outer end etxending through said bore in said bulkhead, a rigid connector body joining said ends of said conductor rods together in substantial axial alignment, a hollow rigid metal loading nut having screw threads thereon, said bulkhead having screw threads cooperating with said nut threads to secure said nut on the low pressure side of said bulkhead about said bore, said ends of said conductor rods and said connector body being disposed within said loading nut, a rigid insulator seal sleeve disposed within said loading nut enclosing said inner end of said low pressure side conductor rod and said connector body, said insulator seal sleeve and said connector body having substantially complementary conical sealing surfaces, rigid metal sealing means disposed within said hollow loading nut and enclosing said insulator seal sleeve and said outer end of said high pressure side conductor rod, said rigid metal sealing means and said insulator seal sleeve having substantially complementary conical sealing surfaces, said rigid metal sealing means and said loading nut having substantially complementary sealing surfaces, said rigid metal sealing means and said bulkhead having substantially complementary conical sealing surfaces, rigid insulating sleeve means interposed between said outer end of said high pressure side conductor rod and said rigid metal sealing means, means on said loading nut for drawing said connector body and said loading nut together to establish initial fluid-tight seals between said connector body and said insulator seal sleeve, between said insulator seal sleeve and said rigid metal sealing means, and between said rigid metal sealing means and said loading nut, and said nut and bulkhead threads being arranged to draw said loading nut and said bulkhead together to establish fluid-tight seals between said rigid metal sealing means and said bulkhead, between said rigid metal sealing means and said rigid insulating means, and between said rigid metal sealing means and said loading nut, said rigid metal sealing means cooperating with said loading nut, said insulator seal sleeve and said connector body to increase the effectiveness of said initial fluid tight seals therebetween as said loading nut and said bulkhead are drawn together.

9. The high pressure fitting according to claim 8, further including:

porting means providing fluid communication between substantially sealed cavities within said hollow loading nut and the low pressure side of said bulkhead, whereby excessively high fluid pressures which may build up in said cavities will be relieved.

10. The high pressure fitting according to claim 8, wherein:
said connector body, said insulator seal sleeve and said rigid metal sealing means define a substantially sealed chamber into which high pressure fluid from the high pressure side of said bulkhead may enter, whereby high pressure fluid which enters said chamber acts on said connector body, said insulator seal sleeve and said rigid metal sealing means to increase the sealing forces therebetween, and increases the sealing forces between said rigid metal sealing means, said loading nut and said bulkhead.

11. The high pressure fitting according to claim 10, wherein said rigid metal sealing means includes:
a cylindrical bearing ring having a central axially extending bore slidably receiving said insulator seal sleeve therein,
a cylindrical sealing collar having a central axially extending bore slidably receiving said bearing ring therein,
said bearing ring having said substantially complementary sealing surface with said loading nut,
said sealing collar having said substantially complementary conical sealing surface with said bulkhead,
said bearing ring and said sealing collar having substantially complementary conical sealing surfaces which are forced into sealing contact when said loading nut and said bulkhead are drawn together, and
said sealing collar having a second central axially extending bore for slidably receiving said insulating sleeve means therein.

12. The high pressure fitting according to claim 11, wherein:
said insulator seal sleeve is made of a high strength, heat resistant, laminated asbestos compound,
said rigid insulating sleeve means is made of a high strength ceramic material, and
said loading nut, bearing ring and sealing collar are made of a heat treated alloy steel.

References Cited
UNITED STATES PATENTS 3,158,682    11/1964    Goellner   ---------- 174—151
2,661,389    12/1953    Resswell.

LARAMIE E. ASKIN, *Primary Examiner.*